Oct. 6, 1925.  
F. WENCEL  
MOLDBOARD  
Filed Feb. 14, 1923

1,556,464

Inventor  
Frank Wencel,

By  
Attorney

Patented Oct. 6, 1925.

1,556,464

UNITED STATES PATENT OFFICE.

FRANK WENCEL, OF MODESTO, CALIFORNIA.

MOLDBOARD.

Application filed February 14, 1923. Serial No. 618,924.

*To all whom it may concern:*

Be it known that FRANK WENCEL, a citizen of the United States of America, residing at Modesto, in the county of Stanislaus and State of California, has invented new and useful Improvements in Moldboards, of which the following is a specification.

The object of the invention is to provide a mold board particularly adapted for breaking up and distributing the soil which is arranged in the form of furrows, to minimize or eliminate the necessity for subsequent work of levelling in preparing the ground for seeding purposes; and with this object in view the invention consists in a construction and combination of parts of which a preferred embodiment is shown in the accompanying drawings, wherein:—

Figure 1:
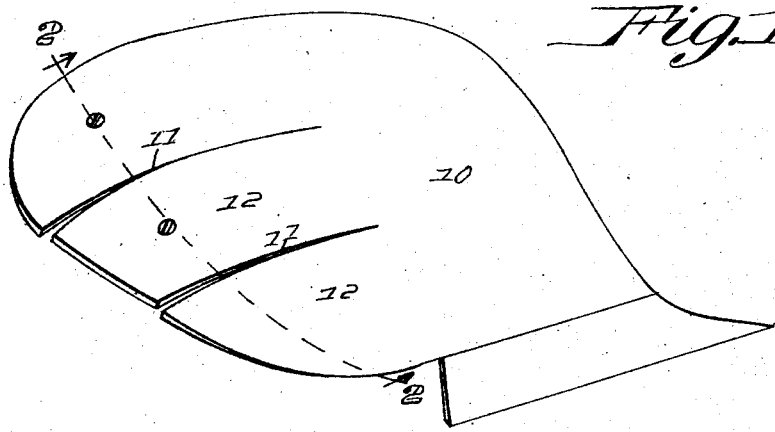
Figure 1 is a perspective view of a device embodying the invention.
Figure 2:
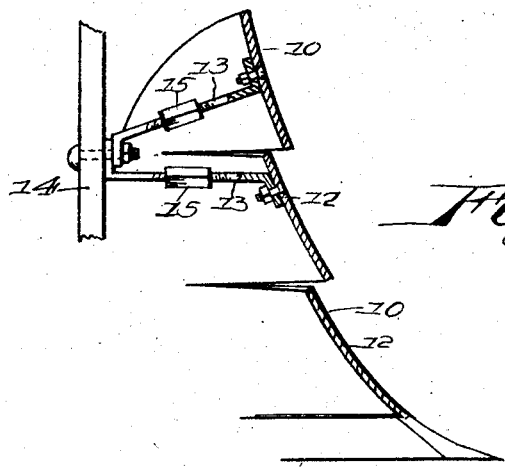
Figure 2 is a sectional view of the same on the plane indicated by the line 2—2 of Figure 1.

The essential feature of the invention consists in providing the mold board 10, which may be of any preferred or conventional form in general outline with a plurality of slits 11 formed longitudinally or in the direction of movement of the plow and in different substantially horizontal planes, said slits extending forward from the rear edge of the mold board to provide rearwardly directed wings 12 which are respectively deflected from the plane of the mold board to a gradually increased extent from the bottom toward the top of the mold board, so that as shown in Figure 2, the uppermost tongue extends outward or forward in the direction of movement of the plow to a greater extent than the next lower tongue, and the latter extends outward or forward to an extent greater than the next lower tongue and so on, to the end that the soil in sliding upward on the mold board in the course of the operation of the plow is sifted or distributed between the rearwardly divergent adjacent edges of the tongues or between the upper edge of one tongue and the lower edge of the next upper tongue, to allow the soil to drop practically into the planes from which it has been removed but in a broken or pulverized and distributed condition. In connection with the tongues thus formed there are provided braces 13 extending from the standard 14 and bolted or otherwise attached to the tongues near their free ends to afford the necessary rigidity to resist the strain applied thereto by the soil. These braces are preferably adjustable to provide for varying the deflection of the tongues and to this end as illustrated in the drawing are fitted with turn buckles 15.

Having described the invention, what is claimed as new and useful is:—

A moldboard formed with a plurality of longitudinal slits arranged in different substantially horizontal planes and extending from the rear edge to provide a plurality of rearwardly directed wings, said wings being deflected from the plane of the moldboard to a gradually increased extent from the bottom toward the top of the moldboard, a standard, and braces terminally secured to the standard and to those wings above the lowermost wings, said braces being longitudinally extensible and contractible to vary the deflection of the connected wings.

In testimony whereof he affixes his signature.

FRANK WENCEL.